(12) United States Patent
Nakao

(10) Patent No.: US 10,366,485 B2
(45) Date of Patent: Jul. 30, 2019

(54) POSITIONING METHOD, VISUAL INSPECTION APPARATUS, PROGRAM, COMPUTER READABLE RECORDING MEDIUM, AND VISUAL INSPECTION METHOD

(71) Applicant: Keyence Corporation, Osaka (JP)

(72) Inventor: Masashi Nakao, Osaka (JP)

(73) Assignee: Keyence Corporation, Osaka (JP)

( * ) Notice: Subject to any disclaimer, the term of this patent is extended or adjusted under 35 U.S.C. 154(b) by 210 days.

(21) Appl. No.: 15/285,498

(22) Filed: Oct. 5, 2016

(65) Prior Publication Data

US 2017/0148153 A1 May 25, 2017

(30) Foreign Application Priority Data

Nov. 24, 2015 (JP) ................. 2015-228727

(51) Int. Cl.
*G06K 9/00* (2006.01)
*G06T 7/00* (2017.01)
*G06K 9/46* (2006.01)
*G06K 9/62* (2006.01)
*G06T 7/73* (2017.01)

(52) U.S. Cl.
CPC .......... *G06T 7/0004* (2013.01); *G06K 9/4671* (2013.01); *G06K 9/6204* (2013.01); *G06T 7/001* (2013.01); *G06T 7/74* (2017.01); *G06T 2207/10004* (2013.01)

(58) Field of Classification Search
None
See application file for complete search history.

(56) References Cited

U.S. PATENT DOCUMENTS

| 8,150,213 | B2 | 4/2012 | Kido |
| 8,155,473 | B2 | 4/2012 | Kido |
| 8,355,590 | B2 | 1/2013 | Kido |
| 8,401,305 | B2 | 3/2013 | Kido |
| 8,406,527 | B2 | 3/2013 | Kido |
| 2017/0148154 | A1 | 5/2017 | Nakao |

FOREIGN PATENT DOCUMENTS

JP 2010-067246 3/2010

*Primary Examiner* — Atiba O Fitzpatrick
(74) *Attorney, Agent, or Firm* — Kilyk & Bowersox, P.L.L.C.

(57) ABSTRACT

A standard image of a product to be a standard for an inspection target is displayed, to set a first region so as to surround a standard pattern in the standard image. Further, a second region for characterizing a position and a posture of the standard pattern is set in the standard image. In a first search step, a feature extracted from the first region set in the standard image is searched from an inspection target image, to roughly obtain the position and the posture of the standard pattern in the inspection target image. In the second search step, the feature extracted from the second region set in the standard image is searched from the inspection target image, to minutely obtain at least one of the position and the posture of the standard pattern in the inspection target image.

14 Claims, 14 Drawing Sheets

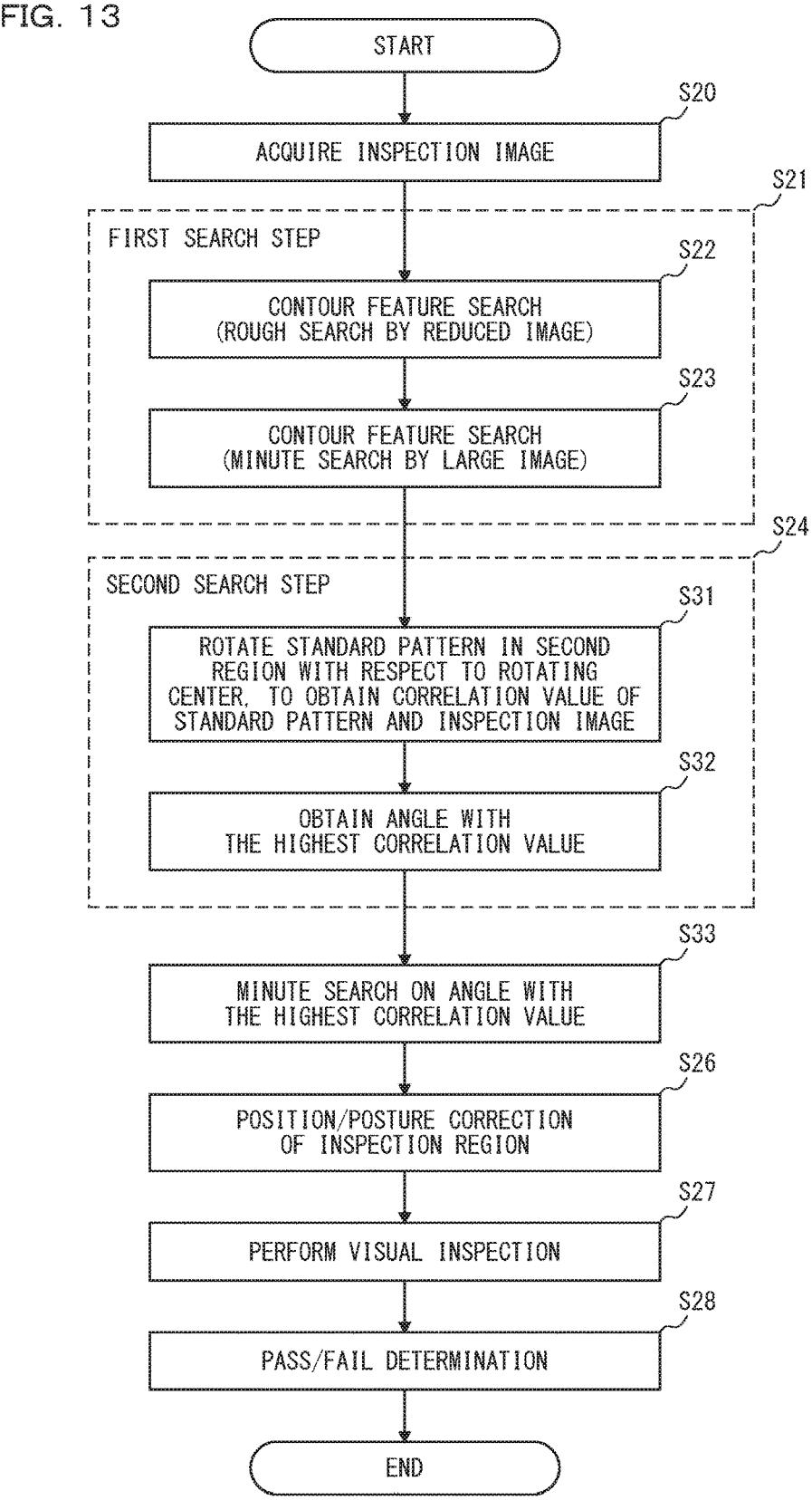

POSITIONING METHOD, VISUAL INSPECTION APPARATUS, PROGRAM, COMPUTER READABLE RECORDING MEDIUM, AND VISUAL INSPECTION METHOD

CROSS-REFERENCE TO RELATED APPLICATIONS

The present application claims foreign priority based on Japanese Patent Application No. 2015-228727, filed Nov. 24, 2015, the contents of which is incorporated herein by reference.

BACKGROUND OF THE INVENTION

1. Field of the Invention

The present invention relates to a positioning method for capturing an image of a product to position the product, a visual inspection apparatus for inspecting appearance of the product, a visual inspection method, a program, and a computer readable recording medium.

2. Description of Related Art

Visual inspection is performed for making a pass/fail determination on a product manufactured in a factory. In the visual inspection, an inspection target is photographed by a camera to acquire an inspection target image. A product is subjected to the visual inspection while being carried by a belt conveyor or the like. However, a position of the product on the belt conveyor is not constant. Hence it is necessary to decide a position where the product appears in the inspection target image. In this positioning, a position of a model pattern in the inspection target image is searched. That is, a partial image similar to the model pattern is specified in the inspection target image, to perform the visual inspection. The model pattern is a pattern to be a standard for a product which is previously acquired from an inspection passed product or the like. The model pattern may be the entire product or a part of the product. In such a search, a template image including the model pattern may be previously prepared, and normalized correlation between the inspection target image and the template image may be used. Further, geometrical search may be performed using edge information extracted from the template image (Unexamined Japanese Patent Publication No. 2010-067246).

Meanwhile, some products manufactured in factories have high symmetry in shape, such as ball bearing, a wheel of an automobile, and a connector of an electronic device. Even when such a product having symmetry is used, by extracting the edge information, the position of the model pattern in the inspection target image can be obtained. However, on the belt conveyor, not only the position of the product is deviated, but a posture of the product may be rotated. Thus, the posture also needs to be corrected. However, it has been difficult to precisely obtain a posture (rotating angle) of the product with high symmetry.

Although even such a product has a portion to be a feature of the posture, an area of the portion is very small as compared with an area of the entire product, and is thus ignored in the search. Further, when a size reduced image is to be used for accelerating search processing, the postural feature may disappear due to the image reduction. When the accuracy in positioning including the posture deteriorates, the accuracy of the visual inspection also deteriorates. For example, it is considered that even a non-defective product is not determined such and discarded. Accordingly, it is an object of the present invention to accurately position a product even when it has symmetry.

SUMMARY OF THE INVENTION

The present invention, for example, provides a positioning method for searching a previously registered standard pattern from an inspection target image obtained by capturing an image of an inspection target, to decide a position and a posture of the standard pattern with respect to the inspection target image. The method includes: a setting step of displaying a standard image of a product to be a standard for the inspection target to set a first region so as to surround the standard pattern in the standard image, and setting a second region for characterizing the position and the posture of the standard pattern in the standard image; a first search step of searching from the inspection target image a feature extracted from the first region set in the standard image, to roughly obtain the position and the posture of the standard pattern in the inspection target image; and a second search step of minutely obtaining at least one of the position and the posture of the standard pattern decided in the first search step, the second search step including searching from the inspection target image a feature extracted from the second region set with respect to the standard image, to minutely obtain at least one of the position and the posture of the standard pattern in the inspection target image.

According to the present invention, it is possible to accurately position a product even when it has symmetry.

BRIEF DESCRIPTION OF THE DRAWINGS

FIG. 6 is a block diagram showing functions of a CPU and the like;

FIG. 13 is a flowchart showing visual inspection including positioning processing.

DETAILED DESCRIPTION OF PREFERRED EMBODIMENTS

Hereinafter, one embodiment of the present invention will be shown. Individual embodiments described below may be useful for understanding a variety of concepts such as a superordinate concept, an intermediate concept, and a subordinate concept of the present invention. Further, a technical range of the present invention is defined by the claims, and is not limited by the following individual embodiments.

Figure 1:
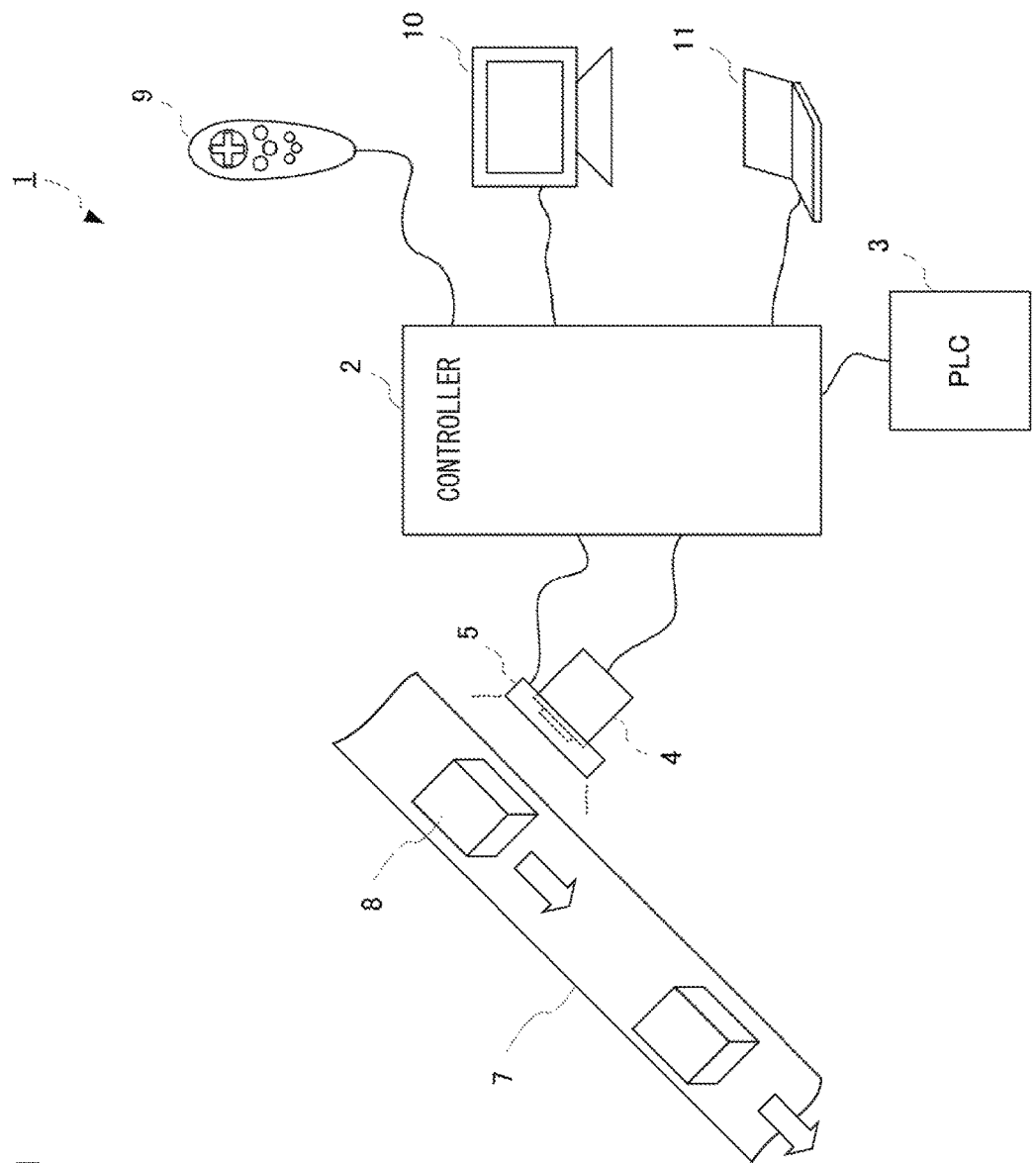
FIG. 1 is a schematic view showing a simple overview of a visual inspection apparatus.

FIG. 1 is a schematic view showing a simple overview of a visual inspection apparatus 1. The visual inspection apparatus 1 includes a controller 2, a programmable logic controller (PLC) 3, a camera 4, an illuminating device 5, a console 9, a monitor 10, and a program creation support device 11. A conveyance device 7, such as a belt conveyor, controlled by the PLC 3 carries an inspection target 8. The camera 4 captures an image of the inspection target 8 illuminated by the illuminating device 5. The inspection target 8 may also be referred to as a workpiece. For example, in accordance with an order from the PLC 3, the controller 2 switches an illuminating condition for the illuminating device 5, or causes the camera 4 to perform imaging.

The controller 2 performs a variety of measurement processing such as edge detection and area calculation from the image of the inspection target 8. For example, the controller 2 performs image processing by use of image data obtained from the camera 4 and outputs a determination signal, as a signal indicating a determination result such as pass/fail of the inspection target 8, to externally connected control equipment such as the PLC 3.

The camera 4 is provided with a camera module having an imaging element for capturing the image of the inspection target 8. As the imaging element, for example, a CMOS (Complementary Metal Oxide Semiconductor) or a CCD (Charge-Coupled Device) can be used. The camera 4 captures the image of the inspection target 8 based on a control signal inputted from the PLC 3, such as an imaging trigger signal to define the timing for fetching image data from the camera 4.

The monitor 10 is a display device such as a liquid crystal panel or a light-emitting panel. It displays the captured image of the inspection target 8, and a result of measurement processing performed using the image data. The monitor 10 may display an image acquired from a non-defective product, such as a reference image to be used for creating comparison data (standard image) for pattern matching. Note that the standard image may be referred to as a model image.

The console 9 is an input device for the user to perform a variety of operation on the monitor 10 (the console 9 can be omitted when the monitor 10 is a touch panel). The console 9 selects each menu item and sets a parameter value on the monitor 10. The console 9 is an example of a pointing device. By viewing the monitor 10, the user can confirm an operating state of the controller 2 that is running. By operating the console 9 while viewing the monitor 10, the user can perform a variety of setting and edition according to the need.

The illuminating device 5 is a device for illuminating the inspection target 8. As the illuminating device 5, there can be employed illuminating devices for performing a variety of illumination, such as coaxial vertical illumination for emphasizing a gloss, low-angle illumination for emphasizing an edge of a scratch or a mark, black-light illumination for throwing black light, surface illumination (trans-illumination for observing transmitted light or a shade of an inspection target), and dome illumination for applying diffused light from all directions. Particularly, the coaxial vertical illumination is an illumination technique of illuminating the entire visual field in a substantially uniform manner. This illumination has an advantage of obtaining almost the same effect as that of an illumination technique of receiving regularly reflected light from the inspection target 8, by disposing the camera 4 and the illuminating device 5 in a V-shape. Further, the low-angle illumination is an illumination technique of disposing a light projecting element such as an LED in a ring shape and illuminating the surface of the inspection target 8 with light at a shallow angle from all circumferential directions. The light applied on the surface of the inspection target 8 is not reflected in a direction to the camera 4, and only the light reflected at an edge portion of the mark or the scratch is received. That is, with the angle of illumination very shallow, the reflection is weak on the gloss surface, and the reflection is strong only at the edge of a tiny scratch on the inspection target 8, whereby clear contrast is obtained.

The program creation support device 11 is a computer (PC) for creating a control program to be run by the controller 2. The control program has a plurality of measurement processing modules for performing different types of measurement concerning the visual inspection as described below. The controller 2 calls and runs a variety of measurement processing modules in accordance with a set sequence. The program creation support device 11 is connected with the controller 2 through a communication cable or a communication network. The setting information such as the control program and the parameter value generated on the program creation support device 11 is transmitted to the controller 2 through the communication cable or the like. In reverse, the setting information, such as the control program and the parameter value, may be fetched from the controller 2, to be re-edited by the program creation support device 11.

In a factory, a plurality of inspection targets 8 flow on a line of the conveyance device 7 such as a conveyor. The controller 2 captures the image of the inspection target 8 by the camera 4 installed above (or lateral to, or below) the inspection target 8, and compares the captured image with a reference image (e.g., a captured image of a non-defective product) or a model image created from the reference image, to determine whether or not a scratch, a defect, or the like exists on the inspection target 8. When it is determined that a scratch, a defect, or the like exists on the inspection target 8, a fail determination is made. On the other hand, when it is determined that a scratch, a defect, or the like does not exist on the inspection target 8, a pass determination is made. As thus described, the visual inspection apparatus 1 makes a pass/fail determination on appearance of the inspection target 8 by use of the captured image of the inspection target 8.

When the visual inspection is to be performed on the inspection target 8, the user needs to set details (parameter values, etc.) of a variety of parameters for use in the inspection. The parameters, for example, include an imaging parameter for defining an imaging condition such as a shutter speed, an illuminating parameter for defining an illuminating condition such as an illuminance, a measurement processing parameter (so-called inspection parameter) for defining an inspection condition showing what kind of inspection is to be performed, and some other parameter. In the visual inspection apparatus 1, details of the variety of parameters are set before the pass/fail determination is made.

The visual inspection apparatus 1 has: a mode for actually performing the visual inspection on the inspection target 8 flowing one after another on the line of the conveyance device 7, namely, an operating mode (Run mode) for actually making the pass/fail determination on the inspection target 8; and a setting mode (Non-Run mode) for setting details of a variety of parameters for use in the inspection.

The visual inspection apparatus 1 has a mode switching unit for switching these modes. The user sets (adjusts) an optimum parameter value for each of a variety of parameters in the setting mode before the pass/fail determination is repeatedly made on a plurality of inspection targets 8 flowing on the line of the conveyance device 7 in the operating mode. Basically, default values are set for a variety of parameters. When the user determines the default value as optimum, adjustment of the parameter value is not particularly required. However, in reality, when the default value remains unchanged, a determination result desired by the user may not be obtained due to a surrounding illuminating environment, the installed position of the camera 4, postural deviation of the camera 4, a difference in focus adjustment, or the like. Accordingly, in the setting mode, the mode can be switched from the operating mode to the setting mode on the monitor 10 or the program creation support device 11 of the controller 2, to edit details of a variety of parameters.

<Hardware Configuration of Visual Inspection Apparatus 1>

Figure 2:
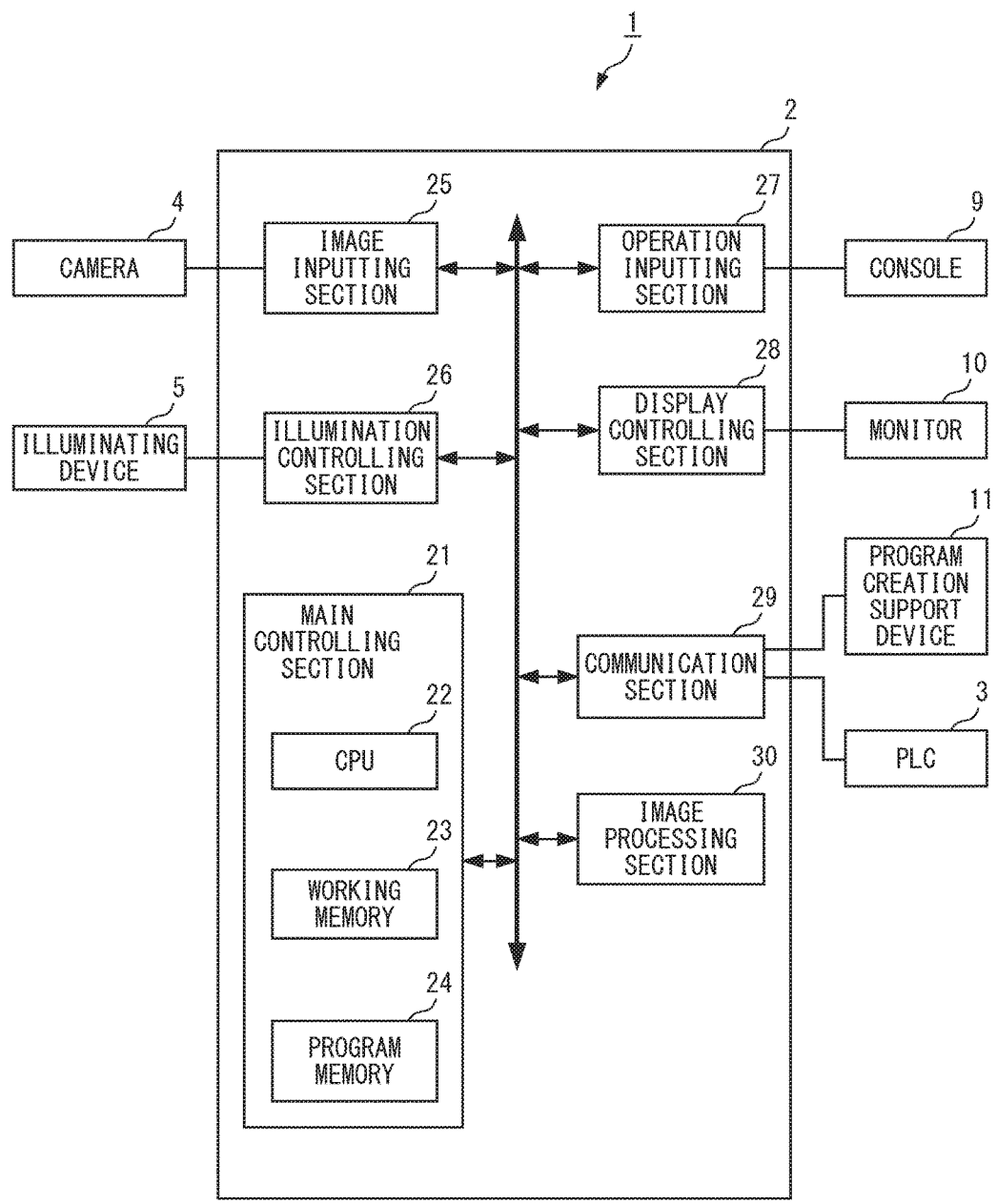
FIG. 2 is a diagram showing an example of a hardware configuration of the visual inspection apparatus.

FIG. 2 is a diagram showing an example of a hardware configuration of the visual inspection apparatus 1. A main control section 21 controls each section of the hardware while performing numeric calculation and information processing based on a variety of programs. For example, the main control section 21 includes: a CPU 22 as an intermediate operation processing device; a working memory 23 such as a RAM which functions as a working area at the time of running a variety of programs; and a program memory 24 such as a ROM, a flash ROM or an EEPROM which stores a startup program, an initialization program, and the like. An illumination controlling section 26 transmits an illumination control signal to the illuminating device 5 based on an order from the CPU 22 of the main control section 21 or from the PLC 3.

An image inputting section 25 is made up of an ASIC (Application Specific Integrated Circuit), which fetches image data acquired by imaging by the camera 4, and the like. The image inputting section 25 may include a frame buffer for buffering image data. Specifically, when receiving an imaging command for the camera 4 from the CPU 22, the image inputting section 25 transmits an image data fetching signal to the camera 4. After the imaging by the camera 4, the image inputting section 25 fetches image data obtained by the imaging. The fetched image data is once buffered (cached).

An operation inputting section 27 receives an input of an operation signal from the console 9. The operation inputting section 27 functions as an interface (I/F) for receiving an operation signal that is outputted by the console 9 in accordance with the user's operation.

The monitor 10 displays details of the user's operation performed using the console 9. Specifically, by operating the console 9, the user can do a variety of things on the monitor 10, such as editing a control program for image processing, editing a parameter value for each measurement processing module, setting imaging conditions for the camera 4, registering a characteristic portion in a reference image as a standard image, and performing search in a search region to set a region matching with the standard image as an inspection region.

A display controlling section 28 is made up of a DSP for display which displays an image on the monitor 10, and the like. The display controlling section 28 may include a video memory such as a VRAM for temporarily storing image data at the time of displaying an image. Based on a display command transmitted from the CPU 22, the display controlling section 28 transmits a control signal for displaying a predetermined image (video image) on the monitor 10. For example, the display controlling section 28 transmits a control signal to the monitor 10 in order to display image data before measurement processing or after measurement processing. Further, the display controlling section 28 also transmits a control signal for displaying on the monitor 10 details of the user's operation performed using the console 9.

A communication section 29 is connected communicably with the external PLC 3 and program creation support device 11, and the like. For example, a sensor (photoelectric sensor, not shown, etc.) is installed on a manufacturing line in order to recognize the arrival timing of the inspection target 8, and is also connected to the PLC 3. The sensor outputs a trigger signal when detecting the inspection target 8. The communication section 29 functions as an interface (I/F) for receiving the trigger signal outputted from the PLC 3. The trigger signal is used as a control signal for causing the camera 4 to perform imaging. The communication section 29 also functions as an interface (I/F) for receiving a control program for the controller 2, and the like, transmitted from the program creation support device 11.

An image processing section 30 is made up of a DSP for calculation, which performs measurement processing such as edge detection and area calculation, and the like. The image processing section 30 may include a memory for storing image data for measurement processing. The image processing section 30 performs measurement processing on image data. Specifically, the image processing section 30 reads image data from a frame buffer of the image inputting section 25, to perform internal transmission to the memory in the image processing section 30. The image processing section 30 then reads the image data stored in the memory, to perform measurement processing.

The program memory 24 stores a control program for controlling each of the illumination controlling section 26, the image inputting section 25, the operation inputting section 27, the display controlling section 28, the communication section 29, and the image processing section 30, by use of a command of the CPU 22 and the like. Further, the control program transmitted from the program creation support device 11 is stored into the program memory 24.

When the CPU 22 receives the imaging trigger signal from the PLC 3 through the communication section 29, it transmits an imaging command to the image inputting section 25. Further, based on the control program, the CPU 22 transmits to the image processing section 30 a command that instructs image processing to be performed. As the device to generate the imaging trigger signal, the PLC 3 may not be used, but a trigger inputting sensor such as a photoelectric sensor may be directly connected to the communication section 29.

The hardware described above is communicably connected with each other through electric communication path (cable) such as a bus.

<Measurement Module (Image Processing Tool)>

Here, a measurement module for performing the visual inspection is referred to as an image processing tool. Note that the image processing tool may also be referred to as an inspection tool or a measurement tool. There are a variety of image processing tools, and main image processing tools include an edge position measuring tool, an edge angle measuring tool, an edge width measuring tool, an edge pitch measuring tool, an area measuring tool, a blob measuring tool, a pattern search measuring tool, a scratch measuring tool, and the like.

Edge position measuring tool: On the screen that displays the image of the inspection target 8, a window is set with respect to an inspection region having an edge position to be detected, and scanning is performed in an arbitrary direction in the set inspection region, to detect a plurality of edges (a place where the brightness changes from bright to dark or a place where the brightness changes from dark to bright). Specification of one edge from the plurality of detected edges is accepted, and a position of the accepted edge is then measured.

Edge angle measuring tool: In the inspection region accepted to be set, two segments are set to measure an angle of inclination of the inspection target 8 from the edge detected in each of the segments. As for the angle of inclination, a clockwise direction can be taken as positive, for example.

Edge width measuring tool: In the inspection region accepted to be set, scanning is performed in an arbitrary direction to detect a plurality of edges and measure a width between the plurality of detected edges.

Edge pitch measuring tool: In the inspection region accepted to be set, scanning is performed in an arbitrary direction to detect a plurality of edges. The maximum/minimum values and an average value of distances (angles) between the plurality of detected edges are measured.

Area measuring tool: Binarization processing is performed on the image of the inspection target 8 captured by the camera 4, to measure an area of a white region or a black region. For example, specification of the white region or the black region as a measurement target is accepted as a parameter, to measure the area of the white region or the black region.

Blob measuring tool: Binarization processing is performed on the image of the inspection target 8 captured by the camera 4, to a measure a number, an area, a centroid position, and the like as parameters with respect to a set (blob) of pixels with the same luminance value (255 or 0).

Pattern search measuring tool: An image pattern (model image) to be a comparison target is previously stored in a storage device, and a portion of the captured image of the inspection target 8, which is similar to the stored image pattern, is detected to measure a position, an angle of inclination, and a correlation value of the image pattern.

Scratch measuring tool: In the inspection region accepted to be set, a small region (segment) is moved to calculate an average concentration value of pixel values and determine a position with a concentration difference not smaller than a threshold as having a scratch.

Other than the above, there are tools such as: an OCR recognition tool for cutting out character information in the inspection region and checking it with dictionary data or the like to recognize a character string; a trend edge tool having a function of shifting a window (region) set on the screen and repeat edge detection in a position of each window; and a gradation tool having a function to measure an average, a deviation, and the like of gradations in the set window. The user can select a required image processing tool according to details of the inspection. Note that these image processing tools merely show typical functions and representative examples of the method for realizing the functions. An image processing tool corresponding to any image processing can be a target of the present invention.

<Basic Flow of Visual Inspection>

Figure 3:
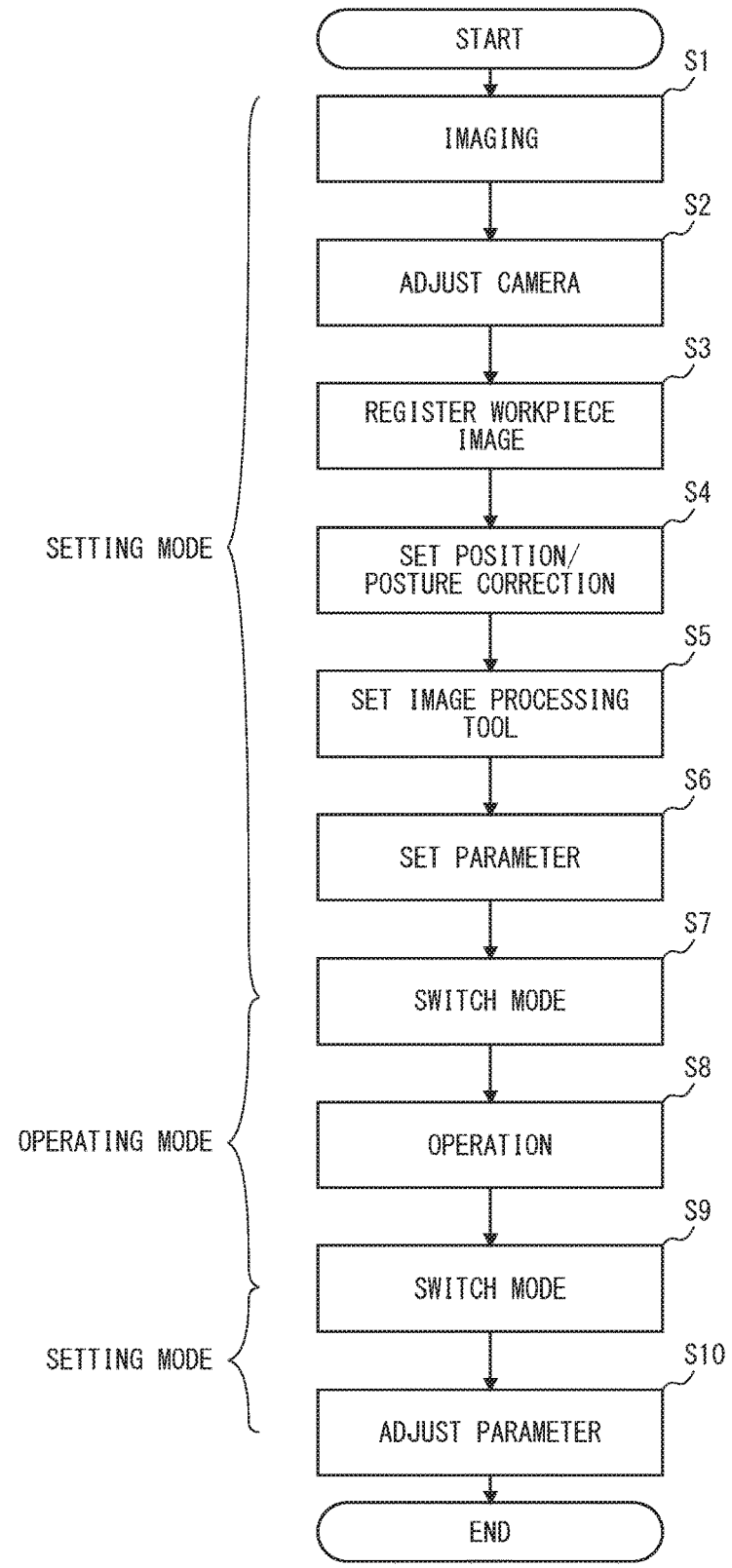
FIG. 3 is a flowchart showing a basic flow of visual inspection processing.

FIG. 3 is a flowchart showing a basic flow of visual inspection processing. The visual inspection processing is divided into a setting mode and an operating mode. The setting mode is a mode for setting a standard image, an inspection region, a search region, a detection point (hereinafter referred to as reference point), a reference line, and a threshold such as a tolerance, which are required for making the pass/fail determination on the inspection target 8. The operation mode is a mode for actually capturing the image of the inspection target 8 and performing image processing such as pattern matching to make the pass/fail determination. For appropriately setting parameters for inspection, it is common that the setting mode and the operating mode are repeatedly performed. Note that the visual inspection processing may also be performed by size measurement, an area tool, a scratch tool, or the like.

In S1, the CPU 22 transmits an imaging order to the camera 4 through the image inputting section 25, to cause the camera 4 to perform imaging. The CPU 22 displays image data acquired by the camera 4 on the monitor 10 through the display controlling section 28. By viewing the image displayed on the monitor 10, the user confirms the posture of the camera 4 and the illuminating state of the illuminating device 5.

In S2, the CPU 22 adjusts an exposure condition such as a shutter speed of the camera 4 based on an instruction inputted by the console 9. Note that the user may manually adjust the posture of the camera 4.

In S3, the CPU 22 transmits an imaging order to the camera 4 in order to fetch as a workpiece image the image of the inspection target 8 that is disposed in an imaging position of the conveyance device 7. Note that the workpiece image (basic image) may be the reference image that is stored in a nonvolatile memory and repeatedly used, or may be an image that is captured each time for creating the standard image. Here, the workpiece image is stored in the working memory 23. Note that the model image may be created from the reference image.

In S4, the CPU 22 performs setting processing for position/posture correction. In the image acquired by the camera 4, the position of the image of the inspection target 8 may be deviated from an ideal position.

Therefore, the CPU 22 acquires the position and posture (rotating angle) of the inspection target 8 from the image of the inspection target 8. The position and posture of the image processing tool (inspection tool) are corrected according to the acquired position, to correct the positional deviation. Note that the position/posture correction may be performed by the image processing section 30. As thus described, the position/posture correction is processing for matching the position and posture of the inspection tool with the position and posture of the image of the inspection target 8.

In S5, the CPU 22 sets a variety of inspection tools described above. For example, there are made a setting for which measurement is to be performed in the visual inspection, and settings for a search region, an inspection region, a reference point, and the like, which are required for performing the measurement.

In S6, the CPU 22 sets a parameter required in the visual inspection (e.g., inspection threshold such as tolerance) based on an instruction inputted by the console 9. In S7, the CPU 22 switches the mode from the setting mode to the operating mode.

In S8, the CPU 22 causes the camera 4 to capture the image of the inspection target 8 in accordance with an instruction from the PLC 3, and causes the image processing section 30 to perform pattern matching or the like. Based on its result, the CPU 22 makes the pass/fail determination, and outputs the determination result to the PLC 3 and to the monitor 10.

In S9, when the CPU 22 receives an input of a mode switching instruction from the console 9, it switches the mode from the operating mode to the setting mode. In S10, the CPU 22 re-sets a parameter based on an instruction inputted by the console 9.

<Reasons why Position/Posture Correction is Required>

The position and posture of the inspection target 8 (inspection passed product) in the standard image for use in setting each inspection tool often do not match with the position and posture of the inspection target 8 (uninspected product) in an image acquired in the operating mode. Note that the inspection passed product may also be referred to as a standard product, a reference product, or a model product. The uninspected product is a product being a target of inspection by the inspection tool, and may be referred to as an inspection target product.

Figure 4A:
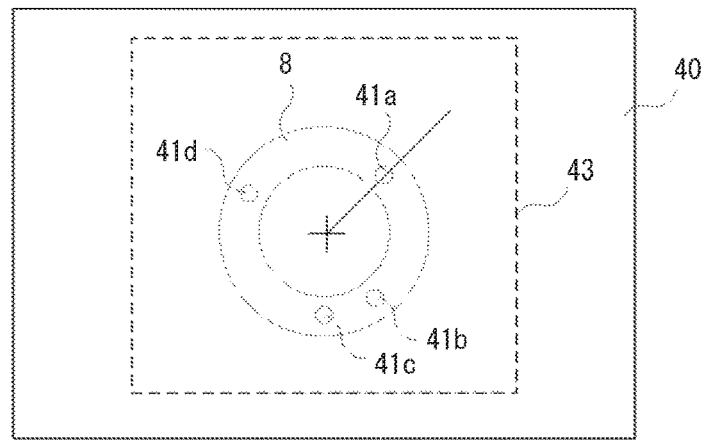
FIGS. 4A to 4C are views for each explaining a position and posture of a standard pattern.

FIG. 4A is a view showing the position and posture of the inspection target 8 (inspection passed product) in a standard image 40. The standard image 40 is an image acquired by capturing the image of the inspection target 8 (inspection passed product) by the camera 4 in the setting mode. The user sets an inspection region 43 of each inspection tool, and the like, with respect to the standard image 40. For example, when a rectangular inspection region 43 is set, a position and posture of another inspection region is decided with coordinates of an upper left vertex of the inspection region 43 taken as the origin, and data showing the decided position and posture can be held in the RAM or the like. One inspection region 43 is shown here, but in reality, the inspection region 43 is set for each inspection tool. Note that the inspection region 43 may be a position correcting window that is set so as to surround a model pattern for correcting the position and posture of the inspection target 8.

The inspection target 8 (inspection passed product) has a symmetrical shape (e.g. a circular shape) in a plan view, and is provided with four screw holes 41a to 41d. In a certain inspection tool, it is determined whether or not positions and shapes of the four screw holes 41a to 41d satisfy a pass determination criterion.

A cross mark shown in FIG. 4A shows the center of a circumscribed circle surrounding the inspection target 8. When a contour (outline) of the inspection target 8 is circular, the circumscribed circle overlaps with the contour. The circumscribed circle is often used for obtaining the rotating center.

Figure 4B:
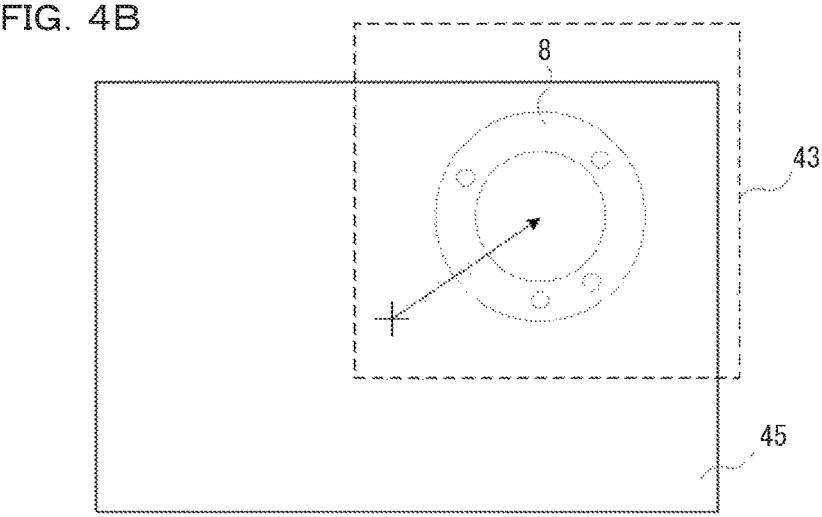

FIG. 4B is a view showing the position and posture of the inspection target 8 (uninspected product) in an inspection image 45. The inspection image 45 is an image acquired by capturing the image of the inspection target 8 (uninspected product) by the camera 4 in the operating mode. The inspection target 8 (uninspected product) shown in FIG. 4B has shifted to the upper right as compared with the inspection target 8 (inspection passed product) shown in FIG. 4A. The position of the inspection region 43 is associated with the position (e.g. central position) of the inspection target 8 (inspection passed product) in the standard image 40. Hence the position of the inspection region 43 needs to be corrected to the upper right in accordance with the position of the inspection target 8 (uninspected product) in the inspection image 45.

Figure 4C:
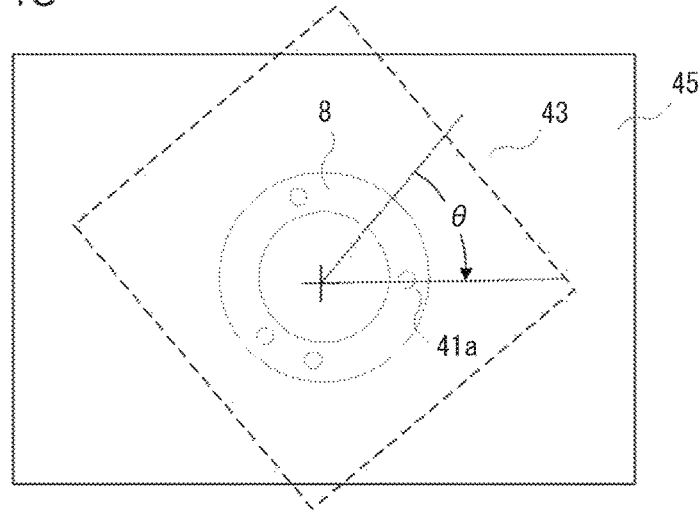

FIG. 4C is a view showing the position and posture of the inspection target 8 (uninspected product) in the inspection image 45. The inspection target 8 (uninspected product) shown in FIG. 4C has been rotated clockwise by θ as compared with the image of the inspection target 8 (inspection passed product) shown in FIG. 4A. Hence the posture of the inspection region 43 also needs to be corrected by θ.

As described above, precisely correcting the position and posture of the inspection region 43 is important in improving the accuracy in inspection result by the inspection tool. Generally, the position and posture of the inspection region 43 are corrected by performing geometrical search, normalized correlation search, or the like in the inspection image 45 to discover the position and posture of the inspection target 8 (uninspected product). In particular, when the contour of the inspection target 8 is asymmetrical, the position and posture of the inspection region 43 are accurately corrected. However, as for the inspection target 8 having a symmetrical shape shown in FIG. 4A and the like, it is difficult to precisely correct the posture of the inspection region 43. For example, in the inspection target 8 as shown in FIG. 4A, an edge is extracted in the search, but an edge amount of the screw holes 41a to 41d is very small as compared with an edge amount that accounts for the contour. For this reason, the edge of the contour in the search has been dominant information in deciding the position and posture of the inspection region 43. Particularly, in a case where a reduced image is to be used for accelerating search processing or the like, the postural feature may be lost due to reduction processing. For example, when the postural feature is lost in the circular inspection target 8 shown in FIG. 4A and the like, it is difficult to decide a precise correction amount of the posture of the inspection region 43. This is because the contour edge of the inspection target 8 has no portion to decide the posture, and because such a postural feature as to decide the posture, like the screw hole, is lost due to image reduction.

<Basic Idea>

In the present embodiment, the CPU 22 and the image processing section 30 set a first region and a second region in accordance with the user's operation. The first region includes a contour feature (outline) of a product (inspection passed product) to be a standard for the inspection target 8. The second region includes a feature (postural feature) to be a standard for the position and posture of the inspection passed product. Further, the CPU 22 and the image processing section 30 roughly search the position and posture of the inspection target 8 (uninspected product) in the inspection image based on the contour feature of the image processing section 30 (first search step). Further, the CPU 22 and the image processing section 30 minutely search the position and posture of the uninspected product by use of the postural feature (second search step). As described above, the position and posture are decided by use of the postural feature, thereby improving the accuracy in position and posture of the inspection region of the inspection tool.

<Setting for Parameter Concerning Position/Posture Correction>

Figure 5:
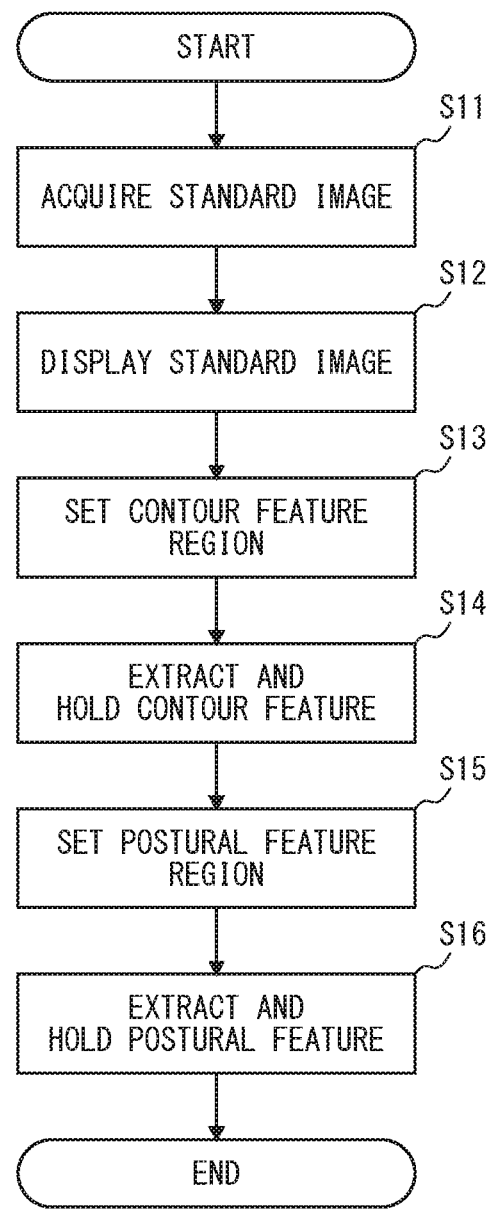
FIG. 5 is a flowchart showing processing for setting a parameter concerning position/posture correction.
Figure 6:
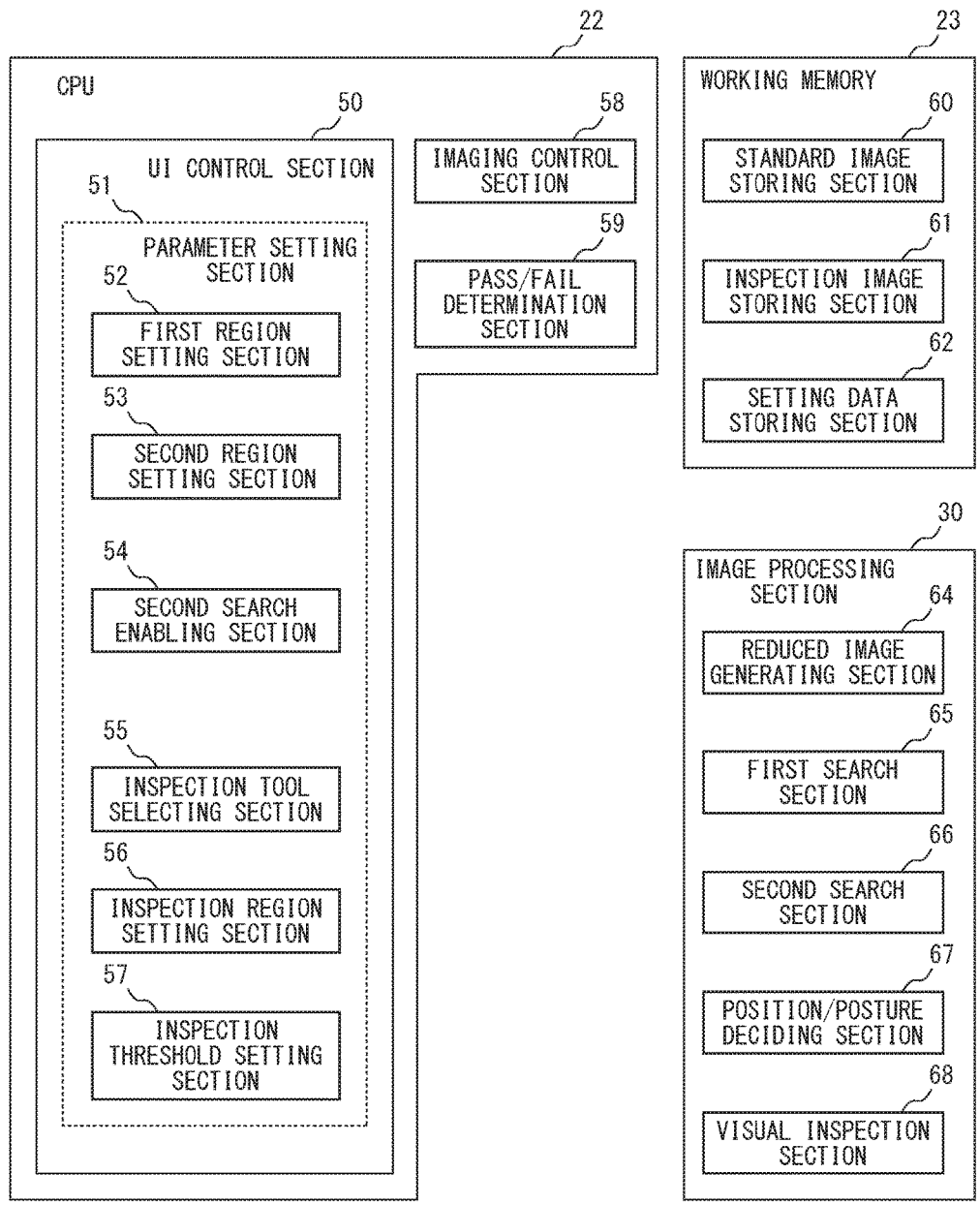

FIG. 5 is a flowchart showing processing for setting a parameter concerning position/posture correction. FIG. 6 shows functions realized by the CPU 22, the image processing section 30, and the like. The CPU 22 runs control programs stored in the program memory 24, to realize a variety of functions. Part or all of these functions may be realized by a logic circuit such as an ASIC or an FPGA.

In S11, the CPU 22 (imaging control section 58) controls the camera 4 and the illuminating device 5 to capture an image of the product (inspection passed product) to be the standard for the inspection target 8, and stores image data of the standard image 40 into a standard image storing section 60. The standard image 40 may only have to be held in the period when the CPU 22 has shifted the mode to the setting mode, but the standard image 40 may be continuously held even in the period when the CPU 22 has shifted the mode to the operating mode. In S12, the CPU 22 (UI control section 50) reads image data of the standard image 40 from the standard image storing section 60, and displays it on the monitor 10 through the display controlling section 28.

In S13, the CPU 22 (first region setting section 52) sets a first region 70 being the contour feature region so as to surround the standard pattern in the standard image 40.

Figure 7A:
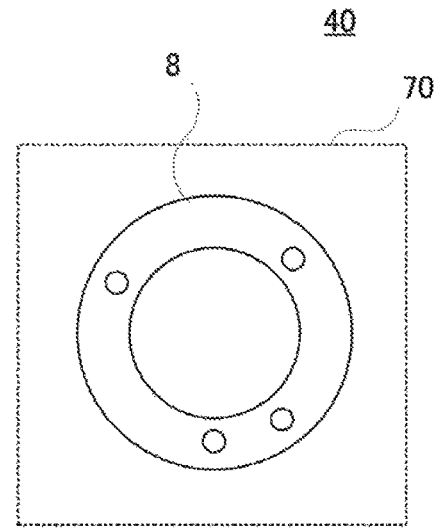
FIGS. 7A to 7D are views for each explaining a contour feature region and a postural feature region.
Figure 7B:
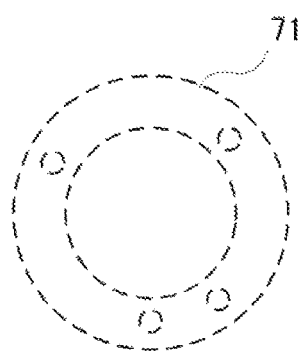

FIG. 7A shows that the first region 70 is set so as to surround the image of the standard pattern (inspection passed product) included in the standard image 40. The first region 70 is set so as to surround the entire inspection target 8 (entire contour and outline). A few methods for setting the first region 70 can be considered. For example, the first region setting section 52 may select a shape (e.g., rectangular shape, circular shape, etc.) of the first region 70 in accordance with operation of the console 9 by the user, and may set the size and position of the first region 70 in accordance with further operation of the console 9. Alternatively, as shown in FIG. 7B, the first region setting section 52 causes the image processing section 30 to extract edges of the inspection target 8 and sets the size and position of the first region 70 so as to include all edges.

In S14, the CPU 22 (first region setting section 52) extracts contour features (information of edges showing the outline, etc.) from the image of the standard pattern in the first region 70, and holds data showing the contour features in the setting data storing section 62. For example, as shown in FIG. 7B, data 71 showing the contour feature is edge data (e.g., edge strength, edge angle, etc.).

Figure 7C:
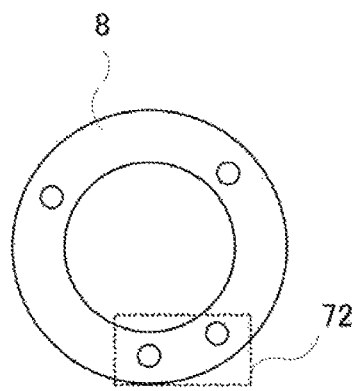

In S15, the CPU 22 (second region setting section 53) sets a second region for characterizing the position and posture of the standard pattern in the first region 70. As shown in FIG. 7C, a second region 72 is set so as to surround a portion of the inspection target 8 which characterizes the position and posture of the inspection target 8. For example, the second region setting section 53 selects a shape (e.g., rectangular shape, circular shape, etc.) of the second region 72 in accordance with operation of the console 9 by the user, and sets the size and position of the second region 72 in accordance with further operation of the console 9.

Figure 7D:

In S16, the CPU 22 (second region setting section 53) extracts features (e.g., edge strength, edge angle, etc.) of the position and posture of the inspection target 8 in the second region 72, and holds data showing the extracted postural feature in the setting data storing section 62. The postural feature may include the feature of the position as well as the feature of the posture. For example, as shown in FIG. 7D, data 73 showing the postural feature is information of the edge extracted from the portion of the inspection target 8 included in the second region 72.

<Example of User Interface for Setting Position/Posture Correction>

The UI control section 50 shown in FIG. 5 controls a user interface of a display system and a user interface of an input system. The user interface of the display system, for example, includes a user interface that is used for setting a variety of parameters concerning the visual inspection and position/posture correction. Further, the user interface of the input system includes the console 9, a keyboard, and the like. A parameter setting section 51 sets a variety of parameters concerning the visual inspection and position/posture correction in accordance with the user's instruction inputted by the console 9 or the like.

Figure 8:
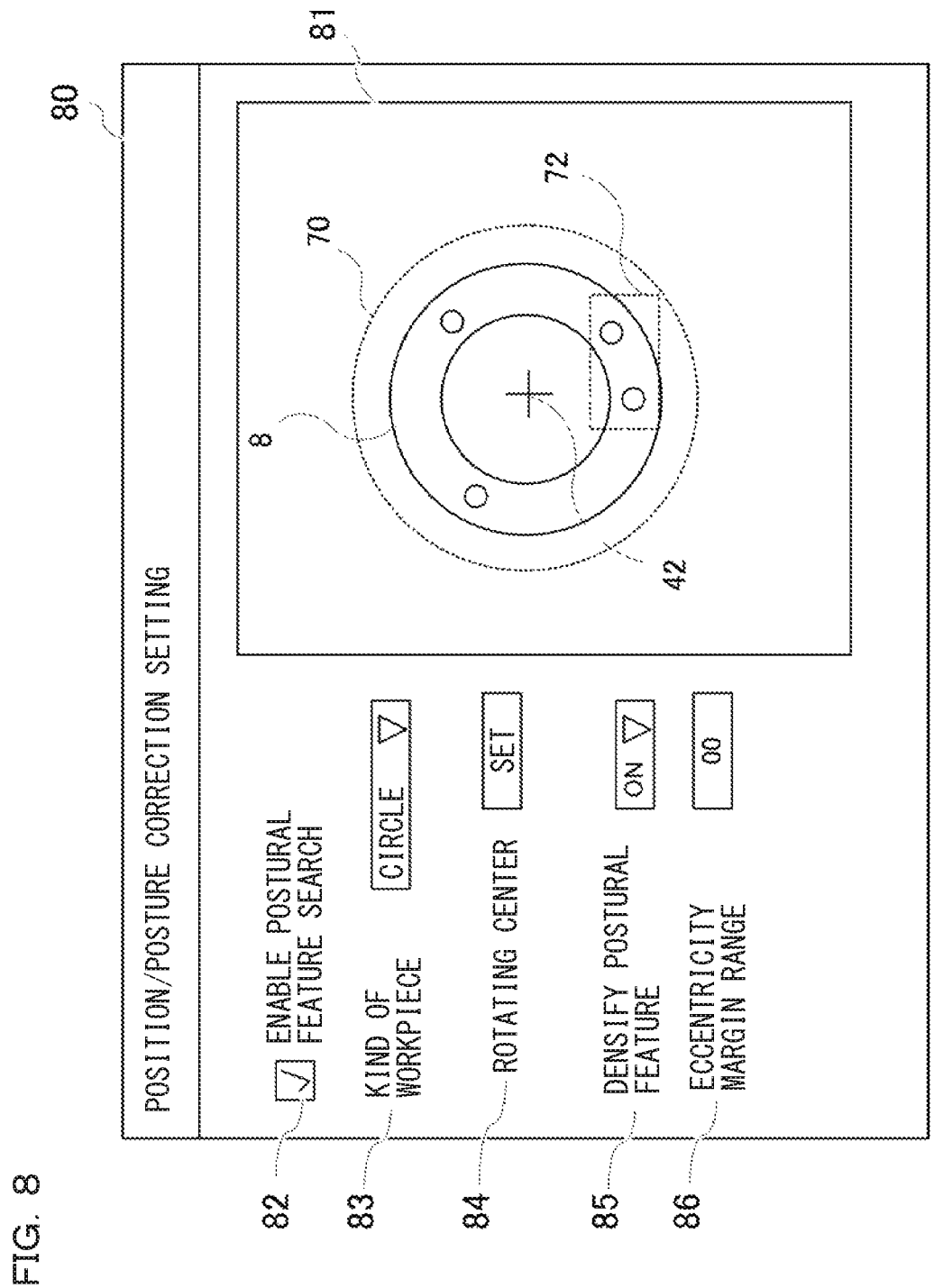
FIG. 8 is a view showing a user interface for setting a parameter concerning position/posture correction.

FIG. 8 shows an example of the user interface for setting the position/posture correction. A setting UI 80 has a standard image display region 81 for displaying an image of the product (inspection passed product) to be the standard for the inspection target 8. The UI control section 50 renders the image data of the standard image 40, read from the standard image storing section 60, in the standard image display region 81.

A check box 82 is a user interface for selecting whether or not to enable postural feature search. A second search enabling section 54 included in the parameter setting section 51 enables the postural feature search being a second search when a check is added to the check box 82, and disables the postural feature search when a check is not added to the check box 82. As for a workpiece where the posture of the inspection region 43 can be sufficiently corrected by the contour feature alone, it is possible to reduce the processing time concerning the position/posture correction by disabling the postural feature search.

A pull-down menu 83 is a user interface for selecting the kind (rotating type) of the workpiece. For example, a circle, vertical inversion, a polygon, and the like are prepared for options. When the circle is selected, whole circumferential search is performed concerning the postural feature. In this case, a circumscribed circle of the standard pattern is decided, and an inspection image is rotated by a certain angle with respect to this circumscribed circle. When the vertical inversion is selected, the search is performed only by two rotating angles of 0 degree and 180 degrees. Thereby, the processing time is reduced. In a workpiece having a shape suitable for the vertical inversion, the robustness of the search is improved. When the polygon is selected, a selection region for selecting the number N of vertexes is enabled, and the user sets the number N of vertexes. Thereby, the inspection image is rotated by a quotient (angle) obtained by dividing 360 degrees by the number N of vertexes. In the polygonal workpiece such as a nut, the robustness of the search is improved while the processing time is reduced.

A rotating center setting section 84 is a user interface for setting a rotating center 42 of the inspection target 8. When a setting button of the rotating center setting section 84 is operated by the console 9, coordinates (position) of the rotating center 42 shown by a cross mark become changeable. That is, the coordinates (position) of the rotating center 42 are set in accordance with the operation of the console 9. In the second search, a rotating amount of the inspection target 8 (uninspected product) in the inspection image is obtained taking the rotating center 42 as a reference. The obtained rotating amount is decided as a correction amount of the posture of the inspection region 43.

The second region 72 and the first region 70 may be set on the same user interface as shown in FIG. 8, or may be set on separate user interfaces.

A postural feature densification setting section 85 is a UI for enabling densification of model points in the second region 72. When the densification is enabled, the density of the model points in the second region 72 is made higher than the density of the model points in the other regions. This leads to setting of a larger number of search lines, which may improve the robustness of the search. Note that the model point is a reference point of the geometrical search which is set at intervals of several pixels on the edge extracted from the image. The search line is a line to be set for each model point, as well as a line extending in a normal direction of the edge. The geometrical search is performed along this search line (Unexamined Japanese Patent Publication No. 2010-067246). In the geometrical search, the number of edges of an uninspected product which overlap a plurality of search lines is calculated, and a position with the largest number of edges is decided as a position of the uninspected product in the inspection image. Note that outline search or the like may be employed as the geometrical search.

An eccentricity margin range setting section 86 is a UI for setting an eccentricity allowable amount of the rotating center 42. When the eccentricity allowable amount increases, the search range increases. That is, the length of the search line is extended. Accordingly, a candidate similar to the postural feature is searched in a wider range. In a search technique without using the search line, such as the normalized correlation search or other pattern matching, another method for extending the search range may be employed. Further, at the time of adapting the postural feature densification, for example, it is possible to employ weighting normalized correlation where a portion selected as the postural feature is weighted. Similarly to the case of increasing the density of the model point, it is possible to perform the search with more emphasis on the postural feature than usual.

<Position/Posture Correction>

Here, the position and posture of the standard pattern in the inspection image are obtained using the geometrical search, and correction amounts of the position and posture of the inspection region are decided according to the obtained position and posture. In the typical geometrical search, an evaluation value such as an edge similarity or a correlation value is obtained while the position of the inspection image is gradually shifted with respect to the standard image, to specify a position with the highest evaluation value. That is, the shift amount of the inspection image is the correction amount of the position of the inspection region. Although a description will be given here assuming that the inspection region of the inspection tool is corrected for each inspection image, the position and posture of the inspection image may be corrected while the inspection region of the inspection tool, decided using the standard image, remains fixed. That is, the position and posture of the inspection image may be corrected instead of correcting the position and posture of the inspection region.

The position/posture correction will be described using FIGS. 6, 9, and 10A to 10D. The position/posture correction is part of the processing to be performed in the operating mode (S8), and is performed for each inspection target 8.

In S20, the CPU 22 (imaging control section 58) controls the camera 4 and the illuminating device 5 to capture the image of the inspection target 8 (uninspected product), and stores image data of the inspection image in an inspection image storing section 61.

In S21, the image processing section 30 (first search section 65) performs the first search step of searching the feature, extracted from the first region 70 of the standard image, from the inspection target image (inspection image), to roughly decide the position and posture of the standard pattern. For example, the first search section 65 compares a contour feature extracted from the inspection image with a contour feature previously extracted from the standard image and held in the setting data storing section 62, to decide the position and posture of the standard pattern in the inspection image. Note that a difference in position and posture between the standard pattern in the standard image and the standard pattern in the inspection image is used as the correction amount of the inspection region of the inspection tool. While the geometrical search and the normalized correlation search are applicable as the search technique, the geometrical search is assumed to be performed here.

The first search step may include a plurality of search steps such as S22 and S23. At least one of these plurality of search steps may be performed. In S22, a reduced image generating section 64 reduces the inspection image to generate a reduced image, and the first search section 65 searches the position and posture of the standard pattern in the reduced image. When the reduced image is to be used, the image processing section 30 also generates a reduced image of the standard image and previously extracts a contour feature, a postural feature, and the like.

Figure 10A:
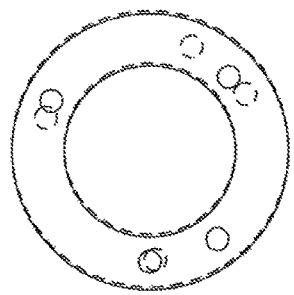
FIGS. 10A to 10D are views each showing an example of a result of search for the position and posture.

FIG. 10A is a view showing an example of a result of search for the position and posture by use of the reduced image. A solid line indicates the standard pattern (inspection passed product), and a broken line indicates the uninspected product. The reduced image is generated by reducing an original image on a scale of ¼, ⅛, 1/16, or the like.

Using the reduced image accelerates the search processing. On the other hand, since the postural feature is small as compared with the contour feature, the postural feature is lost in the reduced image. For this reason, while the position of the uninspected product in the inspection image can be brought closer to the position of the standard pattern in the standard image, the posture is deviated.

In S23, the first search section 65 performs the minute search by use of an image (inspection image) with a larger size than that of the reduced image used in S22, to decide the position and posture of the standard pattern in the inspection image. When the size of the reduced image used in S22 is ⅛, in S23, an image with a size of 1/1 (inspection image itself) may be used, or a reduced image with a size of ¼ may be used. Since more postural features are left in a larger-sized image than a smaller-sized image, it is possible to more minutely decide the position and posture of the uninspected product in the inspection image.

Figure 10B:
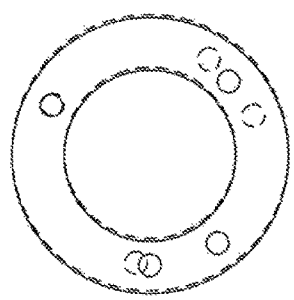

FIG. 10B shows the result of the minute search. It is found from comparison with FIG. 10A that in FIG. 10B, the position of the uninspected product has been brought closer to the position of the standard pattern by the minute search. Also in the minute search, setting a search line in the normal direction of the edge found from the inspection image of the uninspected product and moving the inspection image along the search line bring the position and posture of the uninspected product closer to the position and posture of the standard pattern. However, in the inspection target 8 having high symmetry such as a circular workpiece, even by use of such minute search, it is difficult to precisely obtain the posture of the uninspected product. Thus in the result of the minute search shown in FIG. 10B, the posture of the uninspected product is deviated from the posture of the inspection passed product.

Figure 10C:
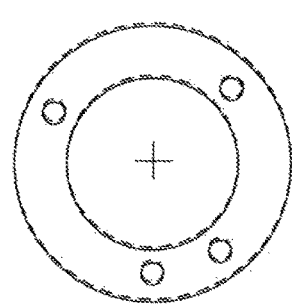

In S24, a second search section 66 performs the second search step of minutely deciding at least one of the position and the posture of the standard pattern in the inspection image, decided in the first search step. Particularly, in the second search step, the postural feature extracted from the second region 72 is searched from the inspection image, and based on the search result, at least one of the position and the posture of the standard pattern in the inspection image is minutely decided. For example, the second search section 66 rotates the inspection image with the previously set rotating center 42 taken as a reference, to bring the position and posture of the standard pattern (uninspected product) in the inspection image closer to the position and posture of the standard pattern (inspection passed product) in the standard image. That is, the deviation amounts of the position and posture of the standard pattern in the inspection image with respect to the position and posture of the standard pattern in the standard image can be precisely obtained. FIG. 10C is a view showing an example of the search result of the second search step. In the second search step, the position and posture of the uninspected product are searched while the inspection image is rotated using the postural feature while not using the contour feature. Since this brings the position and posture of the uninspected product even closer to those of the standard pattern, the posture of the inspection region can be more precisely corrected.

Figure 10D:
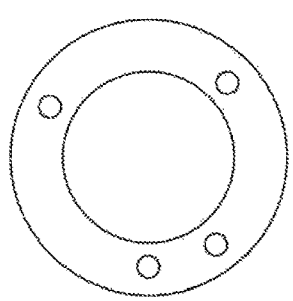

In S25, the first search section 65 again performs the minute search using the contour feature of the standard pattern, to more accurately decide the position and posture of the uninspected product. That is, the deviation amounts of the position and posture of the uninspected product in the inspection image with respect to the position and posture of the standard pattern in the standard image can be more precisely obtained. FIG. 10D shows a final search result, and it is found therefrom that the position and posture of the uninspected product have been accurately decided with respect to the position and posture of the standard pattern. As described above, applying the minute search for the second time can also reduce an influence of positional deviation (eccentricity) of the rotating center.

In S26, a position/posture deciding section 67 corrects the position and posture of the inspection region of each inspection tool by use of the correction amounts of the finally obtained position and posture. That is, the position/posture deciding section 67 decides the correction amounts of the position and posture of the inspection tool from the deviation amounts of the position and posture of the uninspected product in the inspection image with respect to the position and posture of the standard pattern in the standard image. For example, when the posture of the uninspected product is rotated clockwise by θ degrees with respect to the posture of the standard pattern, the inspection region of the inspection tool is rotated clockwise by θ degrees. In other words, in a case where the position and posture of the standard pattern match with those of the uninspected product when the uninspected product is rotated clockwise by −θ degrees with respect to the standard pattern, the position/posture deciding section 67 rotates the inspection region of the inspection tool clockwise by θ degrees. As thus described, the correction amount may be decided by inverting the sign (+, −) of the deviation amount.

Accordingly, the inspection region of each inspection tool is disposed with respect to the standard pattern (uninspected product) in the inspection image. Note that the position and posture of the inspection region of each inspection tool, decided with respect to the standard image, may be fixed, to correct the position and posture of the inspection image. As thus described, since there are relative relations of the position and posture between the inspection image and the inspection region, the position and posture of the inspection image may be corrected, or the position and posture of the inspection region may be corrected.

In S27, a visual inspection section 68 performs the visual inspection on the inspection image by use of the inspection tool selected by an inspection tool selecting section 55. The inspection tool uses the inspection region with the corrected position and posture. In S28, the CPU 22 (pass/fail determination section 59) compares the result of the visual inspection, received from the visual inspection section 68, with the threshold set by an inspection threshold setting section 57, to make a determination as to whether or not the inspection target 8 present in the inspection image is a non-defective product.

As thus described, in the present embodiment, the search is performed on at least two stages, the first search step and the second search step. Further, the second region for characterizing the position and posture of the standard pattern is set with respect to the standard image, and based on the feature acquired from the second region, at least one of the position and the posture of the standard pattern in the inspection image is minutely decided. Thus, even when the contour of the inspection target 8 has a symmetrical shape, at least one of the position and the posture of the inspection region is accurately decided.

<Other Functions Realized by CPU and the Like>

The inspection tool selecting section 55 shown in FIG. 6 selects the inspection tool to be performed on the inspection target 8 in accordance with the user's instruction inputted through the console 9. The visual inspection section 68 of the image processing section 30 has a variety of inspection tools, but all of those are not always necessary. The user selects the inspection tool to be performed according to the inspection target 8. An inspection region setting section 56 sets a region (inspection region) to be the inspection target by the inspection tool selected by the inspection tool selecting section 55. For example, when a measurement tool for measuring a distance from a first part to a second part of the inspection target 8 is selected, an inspection region surrounding the first part and an inspection region surrounding the second part are set with respect to the image of the product (inspection passed product) to be the standard for the inspection target 8. When a measurement tool for measuring an area of the first part of the inspection target 8 is selected, an inspection region surrounding the first part is set with respect to the image of the product (inspection passed product) to be the standard for the inspection target 8. The inspection threshold setting section 57 sets an inspection threshold to be a reference for making the pass/fail determination on the inspection target 8. For example, when a measurement tool for measuring a distance is selected by the inspection tool selecting section 55, the inspection threshold setting section 57 sets as the inspection threshold a range (tolerance) to be a pass criterion for the distance. The inspection threshold is inputted by the user through the console 9 or the like. These setting data are also stored in the setting data storing section 62, and in the operating mode, the setting data is read by the visual inspection section 68 and used.

<Search for Position with Fixed Posture of Standard Pattern>

Figure 11A:
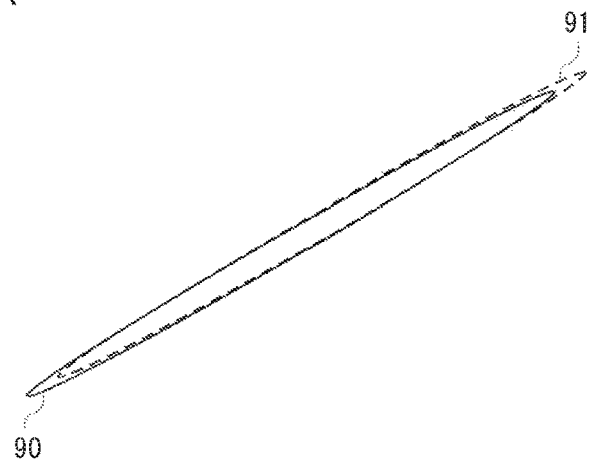
FIGS. 11A to 11D are views each showing an example of performing minute search in a predetermined direction while fixing a posture.
Figure 11B:
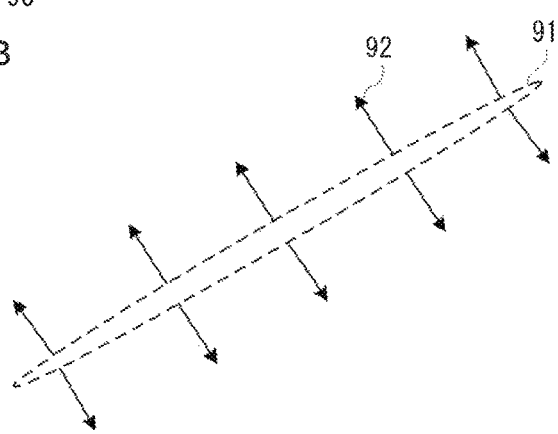
Figure 11C:
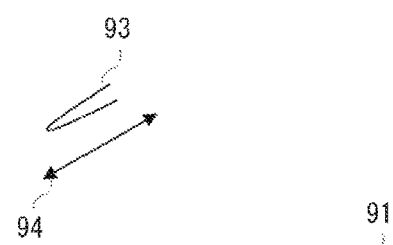

At the time of precisely obtaining the position and posture of the standard pattern in the inspection image, the position and posture of the standard pattern in the inspection image may be precisely obtained by linearly searching a basic pattern only in a specific direction while the posture of the standard pattern is fixed FIG. 11A shows the relation between a standard pattern (inspection passed product) 90 in the standard image and a standard pattern (uninspected product) 91 in the inspection image. As shown in FIG. 11B concerning such a standard pattern, even when the position and posture of the standard pattern are searched by obtaining an edge, setting a search line in the normal direction of the edge and shifting the inspection image along the search line, it is not possible to obtain a sufficiently favorable search result. Accordingly, as shown in FIG. 11C, the second region setting section 53 sets the second region at the edge of the standard pattern to set a positional/postural feature 93. Further, the parameter setting section 51 sets a search direction 94 in accordance with the user's instruction inputted through the console 9. The second search section 66 decides the position and posture of the standard pattern in the inspection image by shifting the positional/postural feature 93 along the search direction 94 in the inspection image. In such a long workpiece, setting the search direction 94 in parallel with the length direction of the workpiece allows the position and posture of the standard pattern in the inspection image to be more precisely decided. Even in the technique not using the search line such as the normalized correlation search, a position where the postural feature matches may not give the highest correlation value (evaluation value), and may be influenced by disturbance or the like. Hence it is advantageous to perform the search based on the postural feature as in the present embodiment.

Figure 11D:
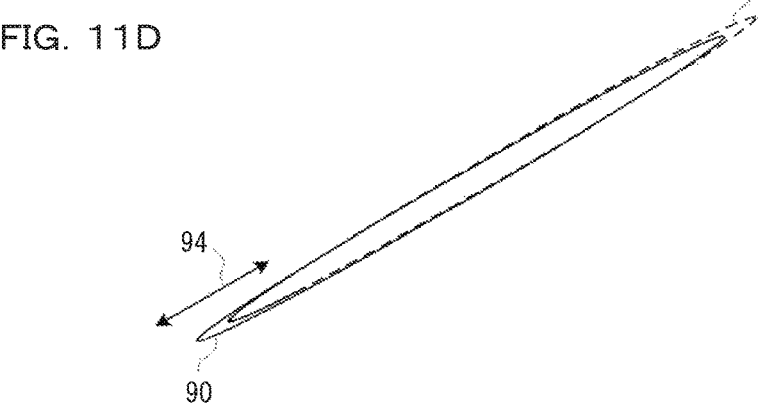

Note that such linear search is performed when "LINE" is selected in the foregoing pull-down menu 83. That is, when "LINE" is selected as the search type in the second search step in the pull-down menu 83, in S24, the second search section 66 linearly moves the inspection image along the search direction 94 as shown in FIG. 11D, to search the position and posture of the standard pattern in the inspection image.

Such a linear search may be effective for a fine wire workpiece, a connector workpiece, and the like. In the connector workpiece, a search error tends to occur since a large number of similar shapes or same shapes (e.g., a large number of terminals) are arrayed. Therefore, setting the specified direction to the search direction improves the accuracy in search of the postural feature in the second search step improves.

Although the search direction 94 has been mainly described, the parameter setting section 51 may set the search distance as well as the search direction 94. This limits the search range, to thereby allow reduction in search time in the second search section 66

<Applications of Postural Feature Search>

Figure 12A:
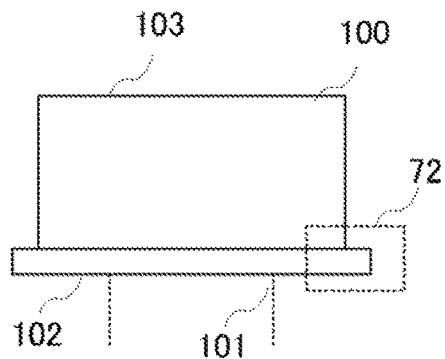
FIGS. 12A to 12C are views each showing an application.

There are a variety of applications of the postural feature search. FIG. 12A is a side view of a capacitor. A capacitor 100 has a bottom 102 provided with a terminal 101, and a top surface 103 located on the opposite side to the bottom 102. Hence, the top and the bottom of the capacitor 100 may be discriminated by the inspection tool in order to connect the terminal 101 to the body of the capacitor 100. The foregoing second region 72 for extracting the postural feature is set to the postural feature in the vicinity of the bottom of the capacitor 100, whereby the top and the bottom of the capacitor 100 can be accurately discriminated by the inspection tool.

Figure 12B:
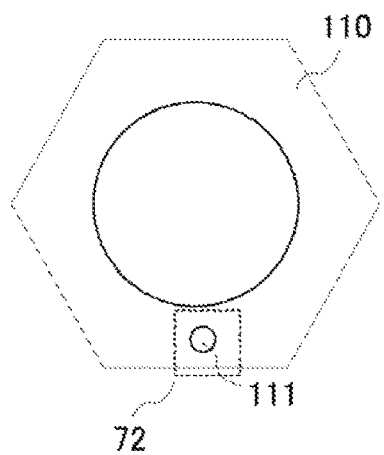

FIG. 12B is a view showing a nut with a phase mark added thereto. Such a regular polygonal workpiece as a nut 110 has high symmetry, and hence its posture is difficult to discriminate in normal geometrical search. In the present embodiment, the second region 72 is set to a phase mark 111 added to the surface of the nut 110, whereby the phase of the nut 110 can be discriminated by the inspection tool based on the postural feature. With the phase of the nut 110 found, it is possible to inspect whether the nut 110 is fastened to the specific phase.

Figure 12C:
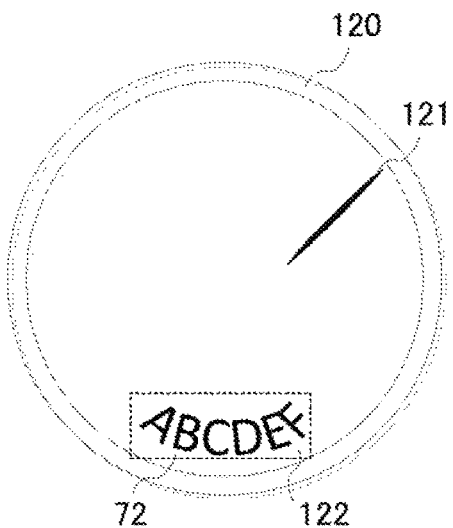

FIG. 12C shows an example of addition of characters 122 to the surface of a circular workpiece 120. When the inspection tool is to detect whether or not a scratch 121 is on the surface of the circular workpiece 120, the characters 122 added to the surface of the circular workpiece 120 may be erroneously detected as a scratch. Hence it is desirable to applying a mask to the characters 122 and prohibit scratch detection within the mask. However, precisely pasting the mask requires precise detection of the posture of the circular workpiece 120 and precise pasting of the mask according to the detected posture. Accordingly, by setting the second region 72 to the characters 122, the image processing section 30 can precisely obtain the posture of the circular workpiece 120. That is, the position/posture deciding section 67 can precisely dispose the mask with respect to the characters 122. This reduces the possibility for the inspection tool to erroneously detect the characters 122 as a scratch, thus allowing accurate detection of the original scratch 121.

<Weighting Postural Feature Search>

Figure 9:
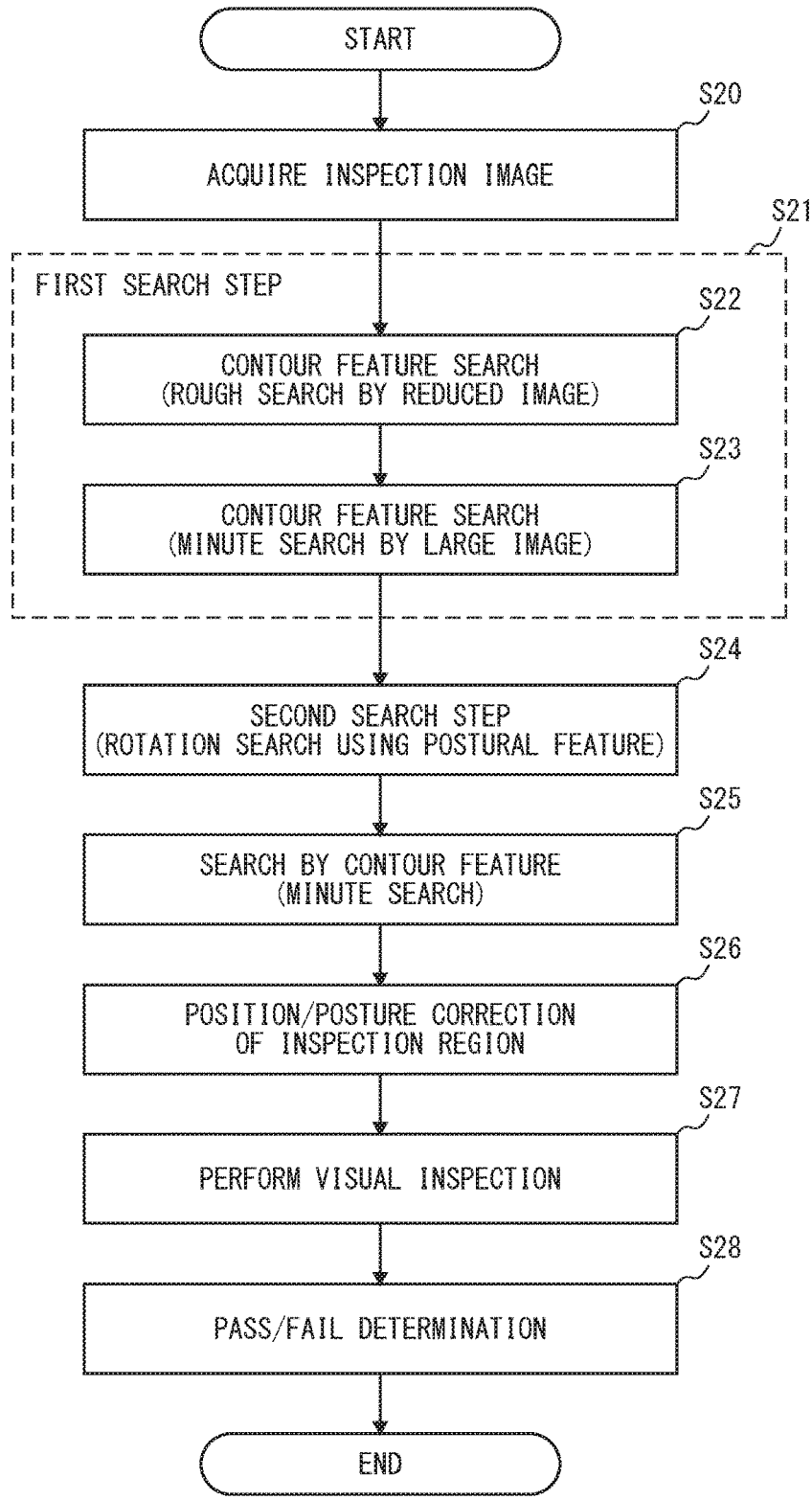
FIG. 9 is a flowchart showing visual inspection including positioning processing.

In S24 of FIG. 9, the position and posture of the standard pattern in the inspection image have been obtained by the geometrical search using only the postural feature. However, a feature other than the postural feature, such as the contour feature, may be considered along with the postural feature. However, since the postural feature is small as compared with the contour feature, a contribution ratio of the postural feature to the search is low. Accordingly, in the present embodiment, a large weight α is added to the evaluation value (e.g., correlation value) of the postural feature alone, to relatively increase the contribution ratio of the postural feature to the search among a plurality of features.

(Evaluation value at a certain rotating angle)=
(Evaluation value of postural feature alone)×α+
(Evaluation value of feature other than postural feature)

A weighted evaluation value is obtained at each rotating angle in such a manner to increase the contribution ratio of the postural feature to the search, whereby the position and posture are accurately decided.

<Normalized Correlation Search>

In FIGS. 9 and 11, the descriptions have been given assuming that the geometrical search is performed in the second search step. In the typical geometrical search, the number of edges in the standard image which overlap with edges in the inspection image is obtained while the position of either the standard image or the inspection image is gradually shifted, and a position (shift amount) with the largest number of overlapping edges is obtained. As described above, some model points may be set on each edge, and a search line extending from each model point to the edge in the normal direction may be set, and the shift may be performed along this search line. In place of such geometrical search, the normalized correlation search as shown in FIG. 13 may be applied. In this case, the second search step (S24) and the minute search (S25) are replaced by S31 to S33. In S31, taking the previously set rotating center 42 as a reference, the second search section 66 rotates the standard pattern in the second region set in the standard image by certain angles, to obtain the correlation value of the standard pattern and the inspection image at each angle. In S32, the second search section 66 obtains the highest correlation value of a plurality of correlation values obtained, to specify an angle at which the highest correlation value is obtained. In S33, the first search section 65 performs the foregoing minute search on the angle at which the highest correlation value is obtained, to reduce the influence of eccentricity.

<Number of Postural Feature Regions>

Figure 14:
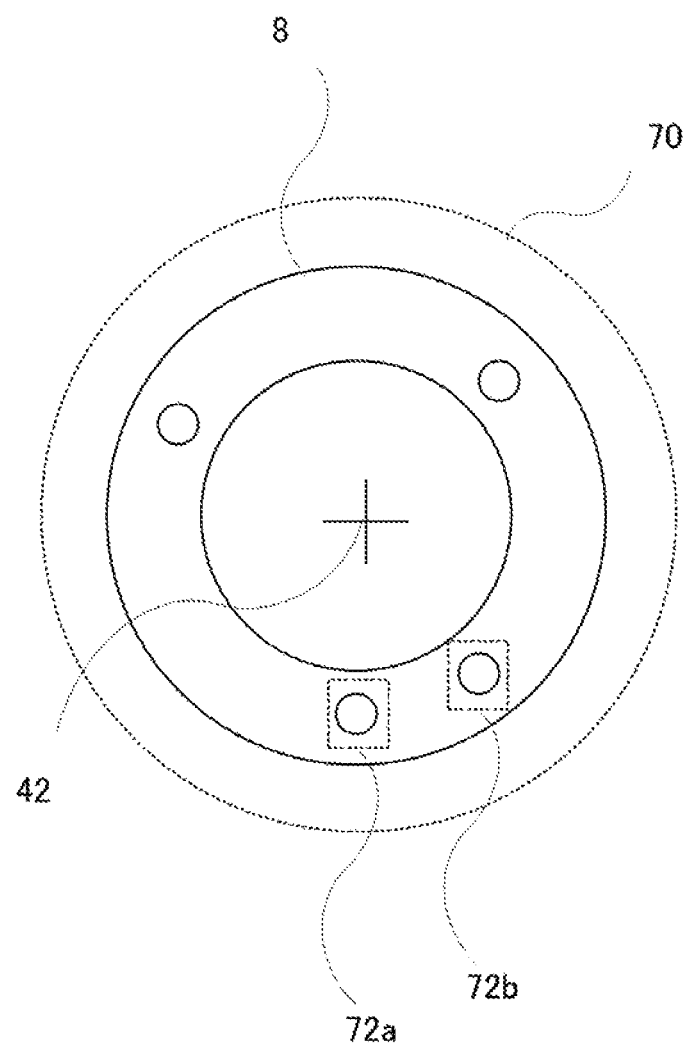
FIG. 14 is a view for explaining a plurality of postural feature regions.

In the user interface shown in FIG. 8, only one second region 72 being the postural feature region has been set. However, a plurality of second regions 72a, 72b may be set as shown in FIG. 14. In this case, a postural feature of each of the second regions 72*a*, 72*b* is extracted, and the geometrical search, the normalized correlation search, or the like is then performed.

<Summary>

As described above, according to the present embodiment, there is provided a positioning method for searching a previously registered standard pattern from an inspection target image (inspection images 45) obtained by capturing an image of the inspection target 8, to decide a position and posture of the standard pattern with respect to the inspection image 45. As described using FIGS. 5 to 8, in the setting step, the standard image 40 of the product (inspection passed product, etc.) to be the standard for the inspection target 8 is displayed, and the first region 70 is set so as to surround the standard pattern in the standard image 40. Further, in the setting step, the second region 72 for characterizing the position and posture of the standard pattern is set in the standard image 40. As described concerning S21, in the first search step, a feature extracted from the first region 70 set in the standard image 40 is searched from the inspection image 45, to roughly obtain the position and posture of the standard pattern in the inspection image 45. As described concerning S24, in the second search step, at least one of the position and the posture of the standard pattern decided in the first search step is minutely obtained. Particularly, in the second search step, the feature extracted from the second region 72 of the standard image 40 is searched from the inspection image 45, to minutely obtain at least one of the position and the posture of the standard pattern in the inspection image 45. As thus described, in the present embodiment, the second region 72 for characterizing the position and posture of the standard pattern is set, and these features are extracted from the second region 72, to obtain the position and posture of the standard pattern in the inspection image 45. Hence it is possible to accurately position a product even when its contour has symmetry.

As described concerning S26, the position and posture of the inspection region 43 of the inspection tool that performs the visual inspection on the inspection target 8 are decided in line with the position and posture of the standard pattern decided through the first search step and the second search step. That is, the position and posture of the inspection region 43 of the inspection tool are corrected in line with the position and posture of the inspection target 8. Naturally, the position and posture of the inspection image 45 may be corrected in line with the position and posture of the inspection region 43 of the inspection tool. This is because the position and posture of the inspection region 43 of the inspection tool have the relative relation with the position and posture of the inspection image 45. As described concerning S27, S28, the visual inspection is performed by the inspection tool in the inspection region 43 disposed with respect to the inspection image 45.

In the present embodiment, even a product having symmetry is accurately positioned, and hence the improvement in accuracy in visual inspection can also be expected.

As described using the check box 82 of FIG. 8, the selection step of selecting whether or not to perform the second search step may be provided. When performing the second search step is selected in the selection step, the position/posture deciding section 67 decides the position and posture of the inspection region in line with the position and posture of the standard pattern decided through the first search step and the second search step. On the other hand, when not performing the second search step is selected in the selection step, the position/posture deciding section 67 decides the position and posture of the inspection region in line with the position and posture of the standard pattern decided by the first search step. There also exists a product where the position and posture of the standard pattern can be sufficiently decided and set by a contour feature alone, such as an asymmetrical workpiece. As for such a product, the processing time in the entire search step can be reduced by omitting the second search step.

As described using FIGS. 4C and 8, in the second search step, the posture of the standard pattern in the inspection image may be minutely decided by rotating the inspection image (particularly, the image in the position correction region) with the rotating center taken as a reference, the rotating center being set in the standard pattern. Even when the inspection target 8 has high symmetry, its position can be accurately obtained. Thus at the time of deciding and fixing the posture, the posture can be efficiently obtained by applying the rotation processing with the rotating center taken as a reference. In the conventional geometrical search and the like, it has been difficult to accurately obtain the posture even when the search is performed along the search line. However, the posture can be obtained more accurately than conventionally by searching the posture by the rotation processing.

As described using FIG. 11, the second search step may include a step of fixing the posture of the standard pattern and linearly changing the position of the standard pattern to minutely decide the position of the standard pattern. A fine wire workpiece may not have symmetry, and it has been difficult to accurately position such a workpiece even when the search line is set in the normal direction of the edge with respect to the workpiece. Accordingly, by fixing the posture of the standard pattern and linearly changing the position of the standard pattern, it is possible to minutely decide the position of the standard pattern.

In the first search step and the second search step, geometrical search may be performed using pieces of edge information extracted from the standard image and the inspection image. Further, in the first search step and the second search step, pattern matching using the standard image and the inspection image may be performed. Moreover, as described using FIG. 13, in the first search step and the second search step, normalized correlation search using the standard image and the inspection image may performed. As described concerning S22, in the first search step, the search may be performed using reduced images obtained by reducing the standard image and the inspection image. This allows positioning at high speed.

As described concerning S22, in the first search step, the rough search is performed using a first reduced image obtained by reducing the inspection image. Further, as described concerning S23, the minute search may be performed using an image with the same magnification as the inspection image, or a second reduced image larger than the first reduced image. Performing such minute search improves the accuracy in positioning.

Further, since the posture is decided with the positioning having been accurately performed, the posture may also be accurately decided.

As described concerning S24, in the second search step, the posture with the highest similarity to standard pattern may be searched in the inspection image while the inspection image is rotated around the previously set rotating center. Further, as described concerning S25, S33, the minute search may be performed for the second time to decide and fix a final position and posture of the standard pattern.

As described above, performing the minute search for the second time may reduce the influence of deviation (eccentricity) of the rotating center.

As seen from FIGS. 7 and 8, in the first search step, the position and posture of the standard pattern (a candidate similar to the standard pattern) in the inspection image are searched based on a similarity of a feature of a relatively large area. Further, in the second search step, the position and posture of the standard pattern (a candidate similar to the standard pattern) in the inspection image are searched based on a similarity of a feature of a relatively small area. As thus described, in the second search step, the search is performed using the feature of the small area while not using the feature of the large area, to thereby improve the accuracy in search for the position and posture.

The foregoing positioning method and visual inspection method may be provided as a program to be run by a computer such as the CPU 22. Further, a computer readable recording medium where such a program as above is recorded is also provided according to the present embodiment.

As described using FIG. 1, the visual inspection apparatus 1 functions as the visual inspection apparatus which searches a previously registered standard pattern (a partial image (candidate) similar to the standard pattern) from an inspection image obtained by capturing an image of the inspection target 8, and decides a position and posture of the standard pattern with respect to the inspection image, to perform visual inspection on the inspection target.

As described using FIG. 6, the first region setting section 52 functions as the setting unit for displaying on the monitor 10 a standard image of a product to be the standard for the inspection target 8, and setting the first region 70 so as to surround the standard pattern in the standard image. The second region setting section 53 function as the setting unit for setting the second region 72 that characterizes the position and posture of the standard pattern in the standard image. The first search section 65 functions as the first search unit for searching from the inspection image the feature extracted from the first region 70, to roughly decide the position and posture of the standard pattern in the inspection image. The second search section 66 functions as the second search unit for minutely deciding at least one of the position and the posture of the standard pattern decided by the first search section 65. Particularly, the second search section 66 searches from the inspection image the feature extracted from the second region 72, to minutely obtain at least one of the position and the posture of the standard pattern. The visual inspection section 68 functions as the inspection unit for correcting the position and posture of the inspection region of the inspection tool that performs visual inspection on the inspection target 8 in line with the position and posture of the standard pattern decided through the first search section 65 and the second search section 66, to perform the visual inspection by the inspection tool by use of the inspection region with the corrected position and posture.

Further, as described using FIGS. 5 and 9, the visual inspection method is provided according to the present embodiment. According to S12, S13, the standard image having the standard product to be the standard for the inspection target 8 is displayed, to set the contour feature region so as to surround the contour feature of the standard product in the standard image. As described concerning S15, the postural feature region is set with respect to the standard image so as to surround the postural feature that characterizes the position and posture of the standard product. As described concerning S20, the image of the inspection target 8 is captured to acquire the inspection image. As described concerning S21, the first search step is performed where the contour feature extracted from the contour feature region of the standard image is searched from the inspection image, to extract the position and posture of the inspection target product in the inspection image. As described concerning S24, the second search step is performed where the postural feature extracted from the postural feature region of the standard image is searched from the inspection image, to minutely decide at least one of the position and the posture of the inspection target product decided in the first search step. As described concerning S26, the disposing step is performed where the inspection region is disposed with respect to the inspection image according to the position and posture of the inspection target product in the inspection image, specified through the first search step and the second search step. Further, as described concerning S27 and the like, the visual inspection step is performed where visual inspection is performed on the inspection target product in the inspection region disposed with respect to the inspection image. Particularly, in the present embodiment, the position and posture of the inspection image are decided based on the postural feature extracted from the postural feature region, to dispose the inspection region, whereby it is possible to accurately perform the visual inspection.

What is claimed is:

1. A positioning method for searching a previously registered standard pattern from an inspection target image obtained by capturing an image of an inspection target, to decide a position and a posture of the standard pattern with respect to the inspection target image, so as to make a pass/fail determination of the inspection target manufactured in a factory, the method comprising:
  a setting step of displaying a standard image of a product to be a standard for the inspection target, and setting a first region so as to surround the standard pattern in the standard image and a second region within the first region, the second region being for characterizing the position and the posture of the standard pattern in the standard image;
  a first search step of searching from the inspection target image a feature extracted from the first region set in the standard image, to roughly obtain the position and the posture of the standard pattern in the inspection target image; and
  a second search step of minutely obtaining at least one of the position and the posture of the standard pattern decided in the first search step, the second search step including searching from the inspection target image a feature extracted from the second region set with respect to the standard image while changing either one of the position or the posture of the standard pattern obtained in the first search step with the other of the position or the posture of the standard pattern obtained in the first search step fixed, to minutely obtain at least one of the position and the posture of the standard pattern in the inspection target image.

2. The positioning method according to claim 1, further comprising:
  a decision step of deciding a position and a posture of an inspection region of an inspection tool that performs visual inspection on the inspection target in line with the position and the posture of the standard pattern decided through the first search step and the second search step; and a performing step of performing the visual inspection by the inspection tool in the inspection region disposed with respect to the inspection target image.

3. The positioning method according to claim 2, further comprising a selection step of selecting whether or not to perform the second search step, wherein, when performing the second search step is selected in the selection step, the position and the posture of the inspection region are decided in the decision step in line with the position and the posture of the standard pattern decided through the first search step and the second search step, and when not performing the second search step is selected in the selection step, the position and the posture of the inspection region are decided in the decision step in line with the position and the posture of the standard pattern decided by the first search step.

4. The positioning method according to claim 1, wherein the second search step includes a step of rotating the posture of the standard pattern with a rotating center taken as a reference and with the position of the standard pattern obtained in the first search step fixed, the rotating center being set with respect to the standard pattern, to minutely decide the posture of the standard pattern in the inspection target image.

5. The positioning method according to claim 1, wherein the second search step includes a step of linearly changing the position of the standard pattern with the posture of the standard pattern obtained in the first search step fixed, to minutely decide the position of the standard pattern.

6. The positioning method according to claim 1, wherein in the first search step and the second search step, geometrical search is performed using pieces of edge information extracted from the standard image and the inspection target image.

7. The positioning method according to claim 1, wherein in the first search step and the second search step, pattern matching or normalized correlation search is performed using the standard image and the inspection target image.

8. The positioning method according to claim 1, wherein in the first search step, search is performed using reduced images obtained by reducing the standard image and the inspection target image.

9. The positioning method according to claim 1, wherein in the first search step, rough search is performed using a first reduced image obtained by reducing the inspection target image, and minute search is performed using an image with the same magnification as the inspection target image, or a second reduced image larger than the first reduced image.

10. The positioning method according to claim 9, wherein in the second search step, a posture with the highest similarity to the standard pattern in the inspection target image is searched while the inspection target image is rotated around a previously set rotating center, and the minute search is performed for the second time to decide and set a final position and posture of the standard pattern.

11. The positioning method according to claim 1, wherein in the first search step, the position and the posture of the standard pattern in the inspection target image are searched based on a similarity of a feature of a relatively large area, and in the second search step, the position and the posture of the standard pattern in the inspection target image are searched based on a similarity of a feature of a relatively small area.

12. A non-transitory computer readable recording medium, comprising a computer program which executes the positioning method according to claim 1.

13. A visual inspection apparatus for searching a previously registered standard pattern from an inspection target image obtained by capturing an image of an inspection target, and deciding a position and a posture of the standard pattern with respect to the inspection target image so as to make a pass/fail determination of the inspection target manufactured in a factory, to perform visual inspection on the inspection target, the apparatus comprising:

a setting unit for displaying a standard image of a product to be a standard for the inspection target, and setting a first region so as to surround the standard pattern in the standard image and a second region within the first region, the second region being for characterizing the position and the posture of the standard pattern in the standard image;

a first search unit for searching from the inspection target image a feature extracted from the first region, to roughly decide the position and the posture of the standard pattern in inspection target image;

a second search unit for minutely obtaining at least one of the position and the posture of the standard pattern decided by the first search unit, the second search unit searching from the inspection target image a feature extracted from the second area while changing either one of the position or the posture of the standard pattern obtained in the first search step with the other of the position or the posture of the standard pattern obtained in the first search step fixed, to minutely obtain at least one of the position and the posture of the standard pattern, and an inspection unit for correcting a position and a posture of an inspection region of an inspection tool that performs visual inspection on the inspection target in line with the position and the posture of the standard pattern decided through the first search unit and the second search unit, to perform the visual inspection by the inspection tool by use of the inspection region with the corrected position and the posture.

14. A visual inspection method for making a pass/fail determination of a product manufactured in a factory, said method comprising:

a setting step of displaying a standard image having a standard product to be a standard for an inspection target, and setting a contour feature region so as to surround a contour feature of the standard product in the standard image and a postural feature region of the standard image within the contour feature region so as to surround a postural feature that characterizes a position and a posture of the standard product;

an acquisition step of capturing an image of an inspection target to acquire an inspection target image;

a first search step of searching, from the inspection target image, the contour feature extracted from the contour feature region in the standard image, to extract a position and a posture of an inspection target product in the inspection target image;

a second search step of searching, from the inspection target image, the postural feature extracted from the postural feature region in the standard image while changing the posture of the inspection target product in the inspection target image obtained in the first search step with the position of the inspection target product in the inspection target image obtained in the first search step fixed, to minutely decide at least one of the position and the posture of the inspection target product, decided in the first search step;

a disposing step of disposing an inspection region in the inspection target image in accordance with the position and the posture of the inspection target product in the inspection target image, specified through the first search step and the second search step; and a visual inspection step of performing visual inspection of the inspection target product in the inspection region disposed with respect to the inspection target image.

* * * * *